(12) United States Patent  
Antonio, II et al.

(10) Patent No.: US 7,626,506 B2
(45) Date of Patent: Dec. 1, 2009

(54) THERMAL SIGNATURE DEVICE

(76) Inventors: Lani D. Antonio, II, 1677 Mesquite Ct., Los Banos, CA (US) 93635; Emma Antonio, 1677 Mesquite Ct., Los Banos, CA (US) 93635

( * ) Notice: Subject to any disclaimer, the term of this patent is extended or adjusted under 35 U.S.C. 154(b) by 182 days.

(21) Appl. No.: 11/503,736

(22) Filed: Aug. 14, 2006

(65) Prior Publication Data

US 2008/0042054 A1  Feb. 21, 2008

(51) Int. Cl.
*G08B 23/00* (2006.01)
(52) U.S. Cl. .................... 340/573.1; 250/271; 340/600
(58) Field of Classification Search ............. 340/573.1, 340/539.13, 572.8, 600; 250/271
See application file for complete search history.

(56) References Cited

U.S. PATENT DOCUMENTS

| 5,479,408 | A | * | 12/1995 | Will ............................ 370/313 |
| 5,552,772 | A |   | 9/1996 | Janky et al. |
| 5,806,692 | A | * | 9/1998 | Pepper ..................... 211/88.01 |
| 5,905,450 | A |   | 5/1999 | Kim et al. |
| 6,069,557 | A | * | 5/2000 | Anglin et al. ............... 340/321 |
| 6,104,295 | A | * | 8/2000 | Gaisser et al. ........... 340/573.4 |
| 6,268,798 | B1 |   | 7/2001 | Dymek et al. |
| 7,005,980 | B1 | * | 2/2006 | Schmidt et al. ........ 340/539.13 |
| 7,215,247 | B1 | * | 5/2007 | Radin .................... 340/539.13 |
| 2002/0057203 | A1 | * | 5/2002 | Borders et al. ........... 340/573.1 |
| 2002/0101349 | A1 | * | 8/2002 | Rojas, Jr. ................. 340/573.1 |
| 2004/0021569 | A1 | * | 2/2004 | Lepkofker et al. ....... 340/568.1 |
| 2005/0151666 | A1 | * | 7/2005 | Saban et al. ........... 340/815.45 |
| 2005/0200487 | A1 | * | 9/2005 | O'Donnell et al. ....... 340/573.1 |

* cited by examiner

*Primary Examiner*—Davetta W Goins
*Assistant Examiner*—Edny Labbees
(74) *Attorney, Agent, or Firm*—Dale J. Ream

(57) ABSTRACT

A thermal signature device according to this invention enables a firefighter to be located with a thermal imaging camera. The device includes an infrared emitting element having a predetermined frequency. The emitting element is situated in a housing that may be temporarily fastened to a firefighter's clothing and manually actuated by the firefighter with a pushbutton to emit infrared signals that may be identified by an infrared camera. The thermal signature device may include a receiver in data communication with the emitting-element such that the emitter may be actuated by a remote transmitter. The housing may include a permanent fastener such as adhesive such that the firefighter may selectively attach the housing to a stationary object, such as a wall, where it may be more visible or to another person in distress. A location determining system utilizing the thermal signature device provides an infrared camera for detecting the emitter-element.

10 Claims, 4 Drawing Sheets

THERMAL SIGNATURE DEVICE

BACKGROUND OF THE INVENTION

This invention relates generally to thermal imaging devices and, more particularly, to a thermal signature device and a system utilizing the thermal signature device to locate a person such as a firefighter in a burning building or other similar environment.

The improved safety of fire fighting personnel is of utmost importance. In fact, the development and use of high-tech devices and systems have been proposed to improve the ability of fire professionals to locate fires and firefighters. For example, a global positioning unit for locating the precise position of a firefighter was proposed in U.S. Pat. No. 6,268,798 to Dymek. Further, a head mounted display in communication with a computer was proposed in U.S. Pat. No. 5,905,450 for tracking and displaying a firefighter's position on a computer screen. Still further, U.S. Pat. No. 5,552,772 proposes a system using the monitoring of electromagnetic signals at predetermined time intervals to track a firefighter's progression through a fire environment. Although assumably effective for their intended purposes, the existing devices do not lend themselves to being carried by firefighters for identification by standard thermal imaging cameras.

Therefore, it would be desirable to have a thermal signature device that may be carried by a firefighter or attached to his gear and that emits an IR wavelength that may be identified by a thermal imaging camera that is otherwise used to find fire hotspots. Further, it would be desirable to have a thermal signature device that may be quickly removed by the firefighter and affixed to another object or structure so as to be more readily identified by a rescuer. In addition, it would be desirable to have a thermal signature device having emergency alert buttons that may be activated by a firefighter who is immobilized or needs assistance.

SUMMARY OF THE INVENTION

Therefore, a thermal signature device and system utilizing that device according to the present invention includes an infrared emitting element attached to a housing. The infrared emitting element may be an infrared LED having a predetermined wavelength. The infrared emitting element may be actuated manually by a firefighter to emit a respective signal by means of a pushbutton on the housing. Alternatively or in addition, the thermal signature device may include a receiver in communication with the infrared emitting element for activating the emitter when the receiver receives appropriate activation data.

The thermal signature device may include a temporary fastener for selectively attaching the housing to an article of clothing, such as a fire suit. The housing may also include a more permanent fastener, such as adhesive, for selectively attaching the housing to a stationary object such as a wall. For example, a firefighter who has become or is becoming immobilized may desire to place the thermal signature device at a heightened position where it will be more visible to rescuers or their thermal imaging cameras. In such a case, he may peel off a protective film and attach the housing to another object. The infrared emitting device may then be manually actuated.

Therefore, a general object of this invention is to provide a thermal signature device for emitting infrared signals that may be identified by an infrared camera, so as to better locate firefighters in a potentially dangerous heat or fire environment.

Another object of this invention is to provide a thermal signature device, as aforesaid, that enables a firefighter to activate an infrared signal emitter manually if he is in distress or in need of assistance.

Still another object of this invention is to provide a thermal signature device, as aforesaid, that may be remotely activated to emit infrared signals, such as by rescuers in search of a missing firefighter.

Yet another object of this invention is to provide a thermal signature device, as aforesaid, which may be selectively removed from a firefighter's clothing and attached to a stationary object where it may be better located by an infrared camera.

A further object of this invention is to provide a thermal signature device, as aforesaid, that is economical to manufacturer and user-friendly to use.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1a is a front view of a thermal signature device according to a preferred embodiment of the present invention;

FIG. 1b is a front end view of the thermal signature device as in FIG. 1a;

FIG. 2 is an exploded view of the thermal signature device as in FIG. 1a;

FIG. 3 is back view of the thermal signature device as in FIG. 1a; and

DESCRIPTION OF THE PREFERRED EMBODIMENT

A thermal signature device 100 and a system 200 utilizing the thermal signature device 100 (also referred to herein as a location-determining system) according to the present invention will now be described in detail with reference to FIGS. 1a through 4 of the accompanying drawings. More particularly, a thermal signature device 100 according to the current invention includes an infrared-emitting element 110.

Figure 1:
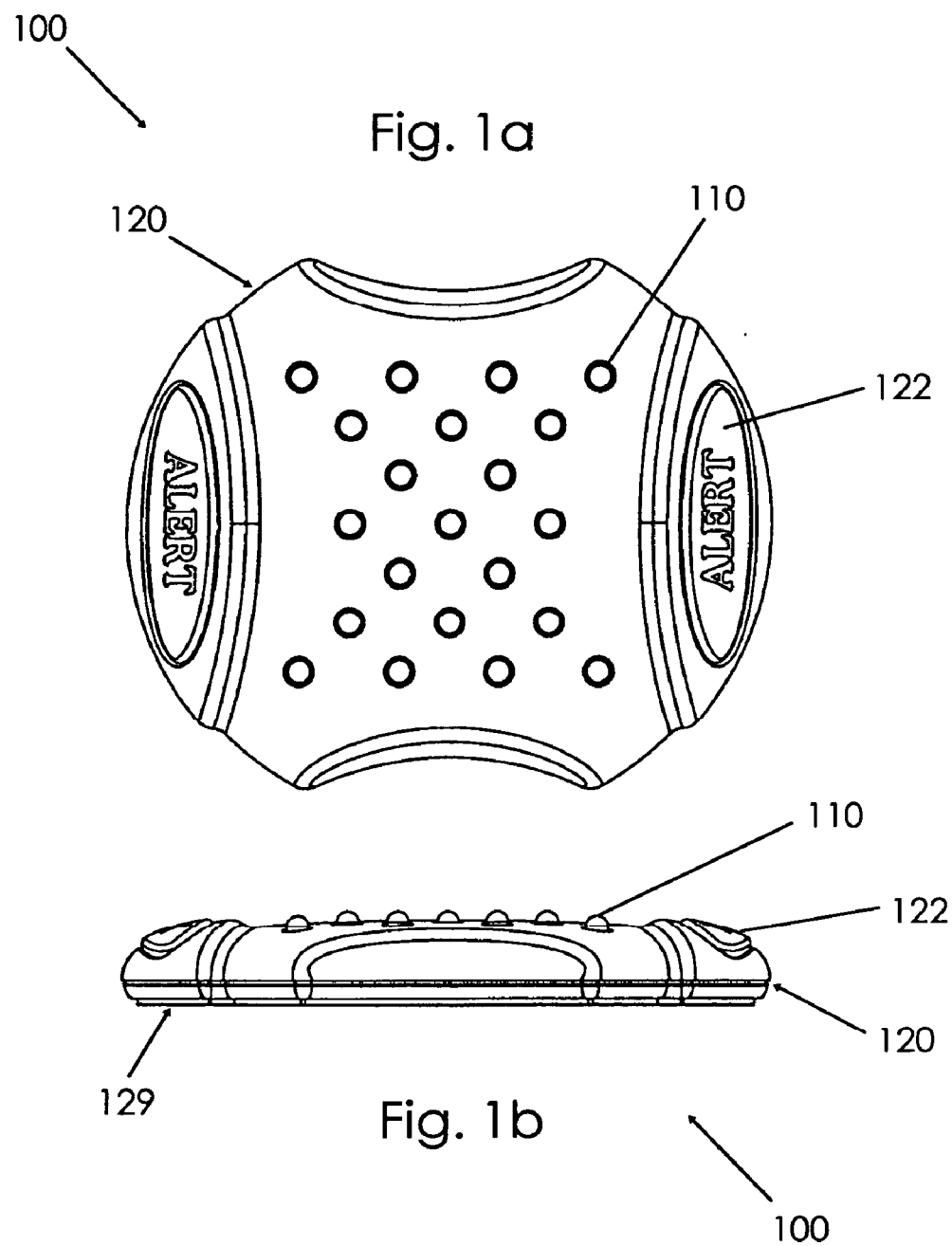
Figure 2:
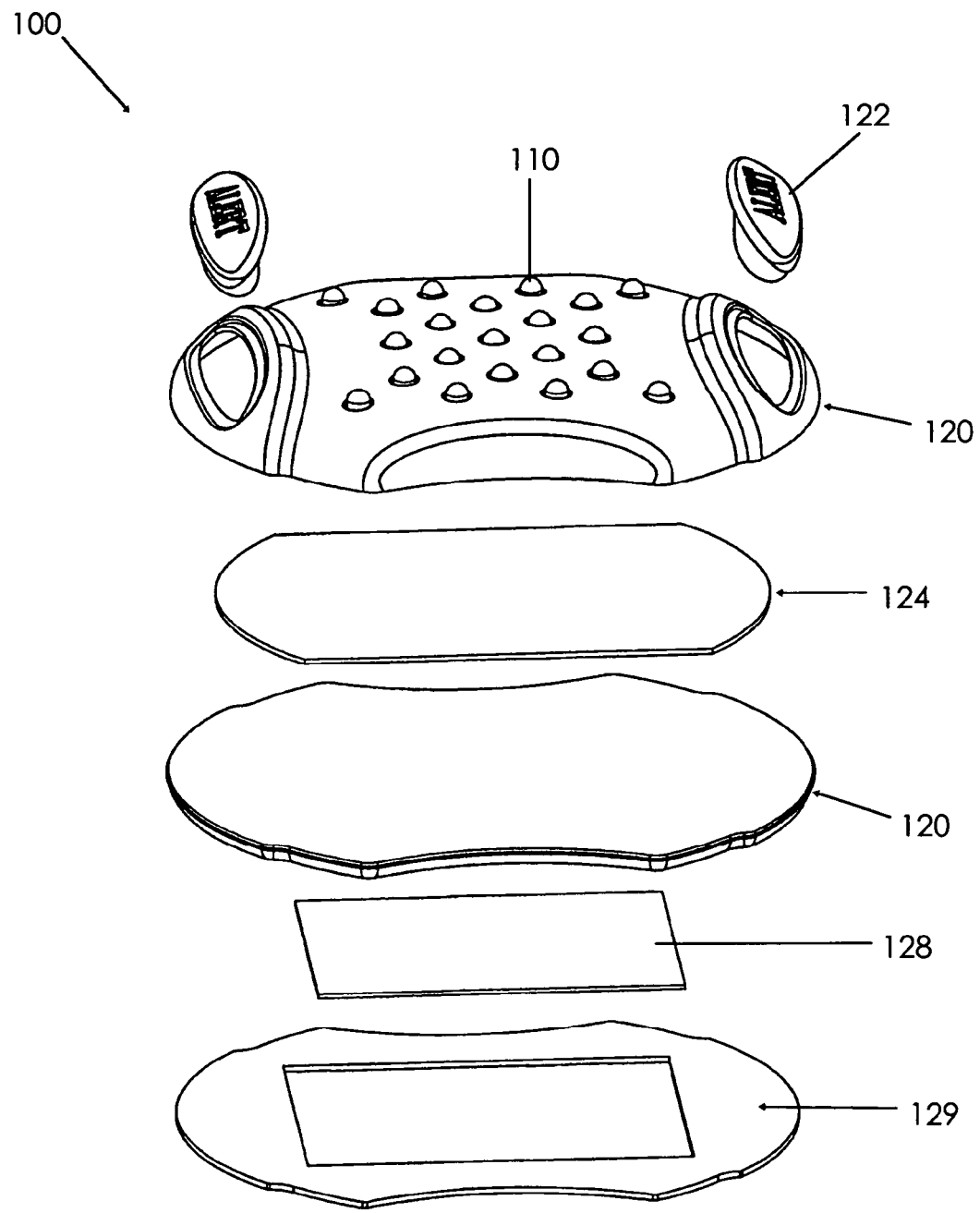

The infrared-emitting element 110 may be, for example, an infrared LED having a predetermined wavelength, and the infrared-emitting element 110 may be waterproof and/or heat resistant. The infrared-emitting element 110 may be coupled to a housing 120 (FIGS. 1a-2), and the housing 120 may be heat resistant and/or waterproof. As shown in FIGS. 1b and 2, the housing includes a front side and a rear side, the infrared-emitting element being positioned on the front side. Means for selectively actuating the infrared-emitting element may be included. More particularly, an input device 122 (e.g., a pushbutton) may be coupled to the housing 120 and in communication with the infrared-emitting element 110 directly or through a processor 124 having programming for actuating the infrared-emitting element 110 upon receiving activation data from the input device 122. Additionally, or alternately, a receiver 126 may be in data communication with the processor 124, and the processor 124 may have programming for actuating the infrared-emitting element 110 upon receiving activation data from the receiver 126. The processor 124 and/or the receiver 126 may be situated and secured inside the housing 120, and the input device 122 may be heat resistant and/or waterproof. As described in additional detail below, the processor 124 may have programming for modulating the infrared-emitting element 110 (e.g., the infrared LED) to obtain desired infrared signatures. This also enables a respective infrared LED to be distinguished over any other infrared LED.

Figure 3:
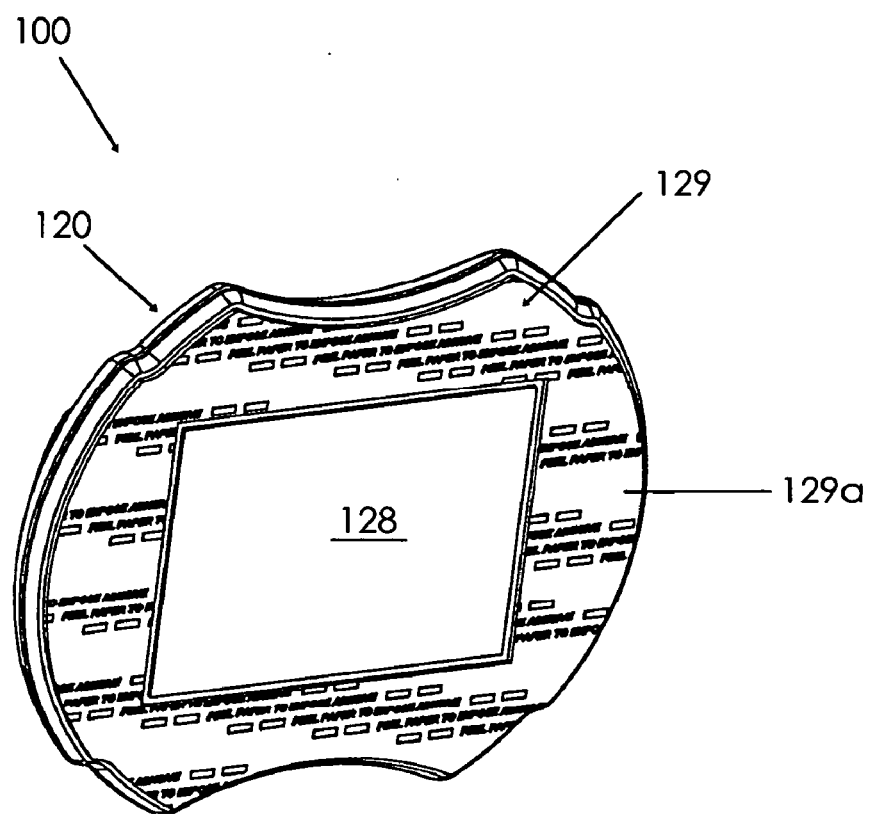

As best shown in FIGS. 2 and 3, the housing 120 may include a temporary fastener 128 (e.g., a hook and loop fastener such as that known as VELCRO®) positioned on the rear side of the housing for selectively attaching the housing 120 to an article of clothing. The housing 120 may also include a permanent adhesive fastener 129 also positioned on the rear side of the housing for selectively attaching the housing 120 to a stationary object (e.g., a wall, etc.). It should be appreciated from FIG. 2 that the temporary and permanent fasteners are co-planar with the permanent fastener being positioned peripherally about the temporary fastener. A film 129a may be coupled to the adhesive fastener 129 so that the adhesive is exposed only when desired (FIG. 3). Though not shown in the drawings, the film 129a may extend beyond the housing 120 so that the film 129a may be easily removed while wearing gloves. The housing 120 may be coated with a reflective material (e.g., silver, Teflon, gold, etc.) to reflect infrared waves and visible light waves.

Figure 4:
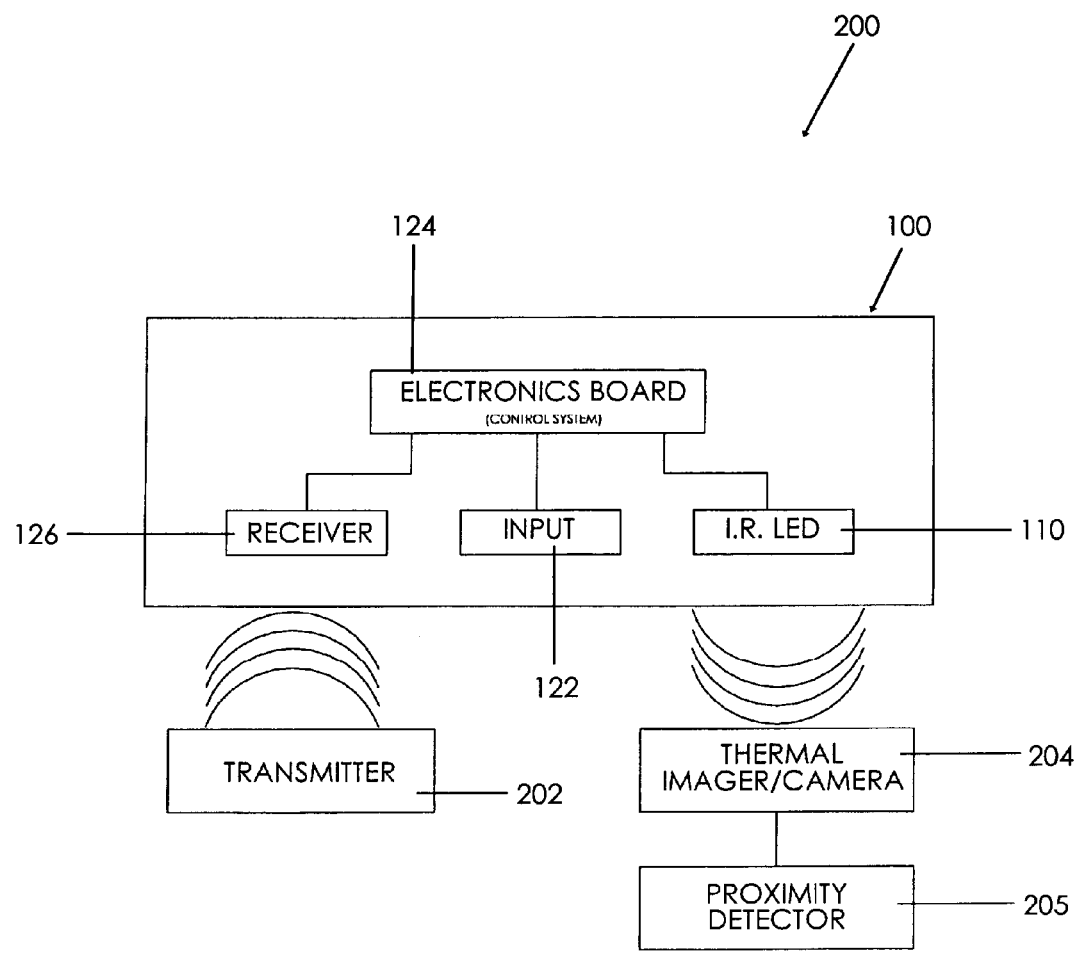
FIG. 4 is a block diagram of a location determining system utilizing the thermal signature device according to the present invention.

FIG. 4 shows the thermal signature device 100 being used in a location-determining system 200. The location-determining system 200 is shown having a transmitter 202 and an infrared camera 204 remote from the thermal signature device 100. The infrared camera may be a traditional thermal imaging camera like those used by firefighters to locate hot spots in a fire environment. The transmitter 202 may be utilized to send activation data to the receiver 126, and the infrared camera 204 may include a proximity detector 205 for determining a distance to the infrared-emitting element 110.

In use, the housing 120 may be coupled to a wearer through the fastener 128. The wearer may then travel into an area (e.g., a burning building or a wildfire). If the wearer wants or needs to display his location, he may press the pushbutton 122, causing the processor 124 to actuate the infrared LED 110. If someone remote from the user wants or needs to display the user's location, the remote person may send activation data to the receiver 126 using the transmitter 202, causing the processor 124 to actuate the infrared LED 110. Once the infrared LED 110 is actuated, it transmits an infrared signal that may be observed by the infrared camera 204. The processor 124 may modulate the infrared LED 110 (i.e., causing the infrared LED 110 to transmit in predetermined pulse increments) to allow the signal to be easily differentiated from the user's surroundings. The infrared camera 204 may alternately or additionally amplify the observed signals based on the infrared LED's known wavelength to differentiate the thermal signature device 100 from its surroundings. The proximity detector 205 may provide information related to the distance between the camera 204 and the thermal signature device 100. If the user needs to draw attention to something or someone besides himself, he may separate the housing 120 from himself by manipulating the fastener 128, removing the film 129a, and attaching the housing 120 to the person or object using the adhesive fastener 129. The infrared LED 110 may then be actuated as described above.

It is understood that while certain forms of this invention have been illustrated and described, it is not limited thereto except insofar as such limitations are included in the following claims and allowable functional equivalents thereof.

What is claimed is as follows:

1. A thermal signature device, comprising:
an infrared-emitting element;
an input device;
a processor in data communication with said infrared-emitting element and said input device for selectively actuating said infrared-emitting element;
a receiver in data communication with said processor;
said processor has programming for actuating said infrared-emitting element upon receiving activation data from said input device;
said processor has programming for actuating said infrared-emitting element upon receiving activation data from said receiver;
wherein:
said processor and said receiver are positioned inside a housing, said housing having front and rear sides;
said infrared-emitting element is an infrared LED and said infrared LED has a predetermined wavelength;
said processor includes programming for modulating said infrared LED;
said infrared-emitting element is situated on said front side of said housing;
said housing includes a permanent fastener having a planar configuration positioned on said rear side of said housing, said permanent fastener defining an opening inwardly disposed from peripheral edges thereof and having an adhesive surface covered by a selectively removable film for selectively attaching said housing to a stationary object;
said housing includes a temporary fastener having a planar configuration that is positioned on said rear side of said housing and within said permanent fastener opening such that said temporary fastener is co-planar with said permanent fastener, said temporary fastener having a hook and loop construction for selectively attaching said housing to an article of clothing;
said permanent fastener is positioned so as to surround said temporary fastener such that said permanent fastener is not accessible when said temporary fastener is attached to an article of clothing.

2. The thermal signature device as in claim 1, wherein:
said housing is heat resistant; and
said input device is heat resistant.

3. The thermal signature device as in claim 2, wherein said housing is waterproof.

4. The thermal signature device as in claim 2, wherein said housing is coated with a reflective material.

5. The thermal signature device as in claim 1, wherein said input device is a pushbutton.

6. A thermal signature device, comprising:
a housing having front and rear sides;
an infrared-emitting element coupled to said front side of said housing;
a permanent fastener having a planar configuration and positioned on said rear side of said housing, said permanent fastener defining an opening inwardly disposed from peripheral edges thereof and having an adhesive surface covered by a selectively removable film for selectively attaching said housing to a fixed surface;
a temporary fastener having a planar configuration that is positioned on said rear side of said housing and within said permanent fastener opening such that said temporary fastener is co-planar with said permanent fastener, said temporary fastener having a hook and loop construction for selectively attaching said housing to an article of clothing;
wherein said permanent fastener is positioned so as to surround said temporary fastener such that said permanent fastener is not accessible when said temporary fastener is attached to an article of clothing;
a receiver situated in said housing;
a processor situated in said housing and in data communication with said receiver and said infrared-emitting element, said processor having programming for actuating said infrared-emitting element upon receiving activation data from said receiver;
an input device coupled to said housing and in data communication with said processor; and
programming in said processor for selectively actuating said infrared-emitting element upon receiving activation data from said input device.

7. A location-determining system, comprising:
a thermal signature device having:
   an infrared-emitting element; and
   an input device in data communication with said infrared-emitting element; and
   a processor in data communication with said infrared-emitting element and said input device for selectively actuating said infrared-emitting element;
   a receiver in data communication with said processor;
   said processor includes programming for actuating said infrared-emitting element upon receiving activation data from said input device;
   said processor includes programming for actuating said infrared-emitting element upon receiving activation data from said receiver;
   said processor and said receiver are secured inside a housing, said housing having front and rear sides;
   wherein said housing includes a permanent fastener having a planar configuration positioned on said rear side of said housing and having an adhesive construction for selectively attaching said housing to a stationary object, said permanent fastener defining an opening inward of a peripheral edge thereof
   wherein said housing includes a temporary fastener having a planar configuration that is positioned on said rear side of said housing and within said permanent fastener opening such that said temporary fastener is co-planar with said permanent fastener, said temporary fastener having a hook and loop construction for selectively attaching said housing to an article of clothing;
   wherein said permanent fastener is configured so as to surround said temporary fastener such that said permanent fastener is sandwiched between said rear side of said housing and said article of clothing when said temporary fastener is attached to said article of clothing;
   wherein said infrared-emitting element is positioned on said front side of said housing;
a transmitter remote from said thermal signature device; and
an infrared camera that includes a proximity detector for determining a distance to said infrared-emitting element.

8. The thermal signature device as in claim 7, wherein said infrared-emitting element is an infrared LED.

9. The thermal signature device as in claim 8, wherein:
said infrared LED has a predetermined wavelength; and
said processor has programming for modulating said infrared LED, whereby said infrared LED is distinguishable from any other infrared LED.

10. The thermal signature device as in claim 9, wherein:
said housing is heat resistant and waterproof; and
said input device is heat resistant and waterproof.

* * * * *